United States Patent Office 3,450,616
Patented June 17, 1969

3,450,616
TRI-ORTHO-TOLYLPHOSPHINE AS A PHOTO-POLYMERIZATION INITIATOR
Roger J. Eldred, Warren, Mich., assignor to General Motors Corporation, Detroit, Mich., a corporation of Delaware
No Drawing. Filed Feb. 23, 1967, Ser. No. 617,830
Int. Cl. C08f 1/20, 3/66, 3/68
U.S. Cl. 204—159.23       7 Claims

ABSTRACT OF THE DISCLOSURE

This invention relates to a process for the production of acrylic resins. Polymerizable acrylic monomer solutions containing a small but effective amount of tri-ortho-tolylphosphine readily polymerize upon exposure to ultraviolet light. The tri-ortho-tolylphosphine acts as a photopolymerization initiator.

---

This invention relates to the use of an initiator in the photopolymerization of monomers, and more particularly to the use of tri-ortho-tolylphosphine as the initiator in the photochemical polymerization of acrylic monomers.

It is known that acrylic monomers may be polymerized by the action of ultraviolet light. In such polymerization reactions the rate of polymerization and also the length of the polymer chain produced are dependent on the nature and concentration of the acrylic monomer, the nature and concentration of an initiator, on the intensity and wavelength of the light, as well as the reaction temperature.

It is the primary object of this invention to provide a novel initiator for the photopolymerization of acrylic monomers. It is a further object to provide a process for the production of polymeric materials by the photopolymerization of acrylic monomers in which the rate of polymerization is markedly increased for a given light intensity of the appropriate wavelengths. These and other objects are accomplished by incorporating small but effective amounts of tri-ortho-tolylphosphine in the acrylic monomer and subjecting the solution to ultraviolet radiation until the polymerization has been effected.

Further objects and advantages of the present invention will be apparent from the following detailed description, reference being had to the following examples wherein preferred embodiments of the present invention are clearly shown.

The process of the present invention will hereinafter be described in detail in terms of incorporating tri-ortho-tolylphosphine as the initiator in the photopolymerization of various acrylic monomers. In general, a suitable amount of tri-ortho-tolylphosphine is dissolved in the acrylic monomer and stirred until a homogeneous solution is obtained. Tri-ortho-tolylphosphine has the following structure:

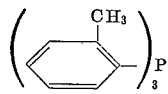

If the acrylic monomer used has a sufficiently low vapor pressure, the solution may be placed in an open reaction receptacle under atmospheric pressure; however, if the acrylic monomer has a high vapor pressure, it may be necessary to place the solution in a closed vessel under a suitable superimposed pressure in order to prevent excessive loss of the monomer due to volatilization. If a volatile acrylic monomer under superimposed pressure is to be polymerized, the reaction vessel should be constructed of a material which will permit the maximum amount of ultraviolet radiation to pass through the reaction vessel. The reaction vessel should not be constructed of soft glass since soft glass will not transmit wavelengths below 3,500 angstroms. Pyrex glass will not transmit below about 3,000 angstroms. Vycor test tubes and reaction vessels are constructed of material which will permit lower wavelength radiation to pass through; these reaction vessels are frequently used in the laboratory for photochemical polymerization. The reactions of this invention in which a volatile acrylic monomer was used were carried out in Vycor test tubes which were loosely corked or which were fitted with a stopcock. The purpose of the cork is to prevent excessive volatilization and at the same time to prevent excessive pressures from building up in the system. Vycor test tubes which were fitted with a stopcock were used primarily when it was desired to carry out the reaction in an oxygen-free atmosphere, such as nitrogen. To perform the reaction in a nitrogen atmosphere, it was first necessary to evacuate the system to a low pressure and then to flush it with a nitrogen atmosphere. This procedure is repeated three or four times to insure that all traces of air and/or oxygen have been removed. The initiator containing acrylic solution is then subjected to ultraviolet light by means of an ultraviolet lamp (Hanovia) with a high pressure, mercury vapor arc tube providing radiations with wavelengths ranging from 1.849 angstroms to 4,000 angstroms positioned a distance of one to two inches from the solution for periods of time ranging from a few minutes to several hours. As will hereinafter appear, clear, tough, solid polymers are obtained when tri-ortho-tolylphosphine was used as the initiator in the photopolymerization of acrylic monomers.

Example 1

|                          | Parts by weight |
|--------------------------|-----------------|
| Tri-ortho-tolylphosphine | 2               |
| Glycidyl methacrylate    | 98              |

The solution of these two components was prepared and placed in an aluminum dish at room temperature. The monomeric material was then subjected to radiation from an ultraviolet lamp which was positioned a distance of one to two inches from the solution. In 6 minutes the liquid monomer turned into a clear, tough solid. The yield of poly(glycidyl methacrylate) was 94%.

The effectiveness of tri-ortho-tolylphosphine as a photo initiator in glycidyl methacrylate was compared with the known photo initiators benzoyl peroxide and triphenylphosphine under conditions identical to and at the same time as Example 1. Results indicated that it required 9 minutes to obtain a 86% yield of poly(glycidyl methacrylate) with benzoyl peroxide and that in 30 minutes the yield of poly(glycidyl methacrylate) with triphenylphosphine was less than 50%. This unexpected superiority of tri-ortho-tolylphosphine as a photo initiator of glycidyl methacrylate also exists in the polymerization of methyl methacrylate.

Example 2

|                          | Parts by weight |
|--------------------------|-----------------|
| Tri-ortho-tolylphosphine | 2               |
| Methyl methacrylate      | 98              |

The solution of these two components was prepared and placed in an aluminum dish at room temperature. The monomeric material was then subjected to radiation from an ultraviolet lamp which was positioned a distance of 1 to 2 inches from the solution. In 20 minutes the liquid monomer turned into a clear, tough solid. The yield of poly(methyl methacrylate) was 12%.

A comparison of tri-ortho-tolylphosphine as a photo initiator in methyl methacrylate with either benzoyl peroxide or triphenylphosphine was made under conditions identical to and at the same time as Example 2. It was found that in 25 minutes the methyl methacrylate solutions containing either 2 weight percent triphenylphosphine or 2 weight percent benzoyl peroxide had both evaporated and no polymerized material had been obtained using either photo initiator. These tests are additional evidence that tri-ortho-tolylphosphine is a superior photo initiator to both benzoyl peroxide and to triphenylphosphine in the polymerization of acrylic monomers.

Example 3

Tri-ortho - tolylphosphine—$8 \times 10^{-4}$ moles/liter in methyl methacrylate solution.

The solution of these two components was placed in a Vycor test tube which was fitted with a stopcock; it was degased and flushed three times with nitrogen until the solution was blanketed under an atmosphere of nitrogen. It was then irradiated under the nitrogen atmosphere with ultraviolet light at a temperature of 20° C. for a period of 15 minutes. The polymer was precipitated with heptane and the rate of polymerization was determined by standard methods to be $8.84 \times 10^{-4}$ moles/liter/second.

Polymerization rate studies were made at the same time as Example No. 3 under identical conditions comparing the tri-ortho-tolylphosphine with tri-para-tolylphosphine, tri-meta-tolylphosphine and triphenylphosphine. The following table tabulates the polymerization rates for the photo initiators mentioned above.

| Photo Initiator | Concentration, Moles/ Liter | Monomer | Rate of Polymerization Moles/ Liter/ Second |
| --- | --- | --- | --- |
| Tri-ortho-tolylphosphine | $8 \times 10^{-4}$ | Methyl Methacrylate | $8.84 \times 10^{-4}$ |
| Triphenylphosphine | $8 \times 10^{-4}$ | do | $3.36 \times 10^{-4}$ |
| Tri-para-tolylphosphine | $8 \times 10^{-4}$ | do | $2.34 \times 10^{-4}$ |
| Tri-meta-tolylphosphine | $8 \times 10^{-4}$ | do | $3.87 \times 10^{-4}$ |

As shown by the data in the table, tri-ortho-tolylphosphine is more effective than either the para or meta analog as well as triphenylphosphine. These results are entirely unexpected and the reason for this large difference in effectiveness between the ortho, para and meta compounds is unknown at this time.

Tri-ortho-tolylphosphine was compared with tri-phenylphosphine as a photo initiator in methyl methacrylate at lower concentrations. This data is given in the following table.

| Photo Initiator | Concentration, Moles/ Liter | Monomer | Rate of Polymerization Moles/ Liter/ Second |
| --- | --- | --- | --- |
| Tri-ortho-tolylphosphine | $4 \times 10^{-4}$ | Methyl Methacrylate | $6.29 \times 10^{-4}$ |
| Triphenylphosphine | $4 \times 10^{-4}$ | do | $2.26 \times 10^{-4}$ |
| Tri-ortho-tolylphosphine | $1 \times 10^{-4}$ | do | $3.79 \times 10^{-4}$ |
| Triphenylphosphine | $1 \times 10^{-4}$ | do | $0.68 \times 10^{-4}$ |

At these concentrations, the difference in effectiveness is also large.

As indicated by the above examples, tri-ortho-tolylphosphine is an effective initiator for the photopolymerization of a broad class of acrylic monomers. When the photopolymerization is caried in an air atmosphere, the useful range of tri-ortho-tolylphosphine concentration was found to be 0.08 to 5.0 percent by weight with the preferred concentration being about 1.0 percent by weight. Since oxygen interferes with the photopolymerization of acrylic monomers, it is frequently preferable or necessary to carry out the polymerization in an oxygen-free atmosphere such as nitrogen, carbon dioxide, helium, argon, and so forth. When the photopolymerization is carried out in an oxygen-free atmosphere the rate of reaction is faster and the yield of the polymer is much higher. If the reaction is carried out in an oxygen-free atmosphere, such as nitrogen, as is indicated in Example 3, the required initiator concentration range is lower, between 0.003 to 1.1 percent by weight with the preferred concentration being about 0.5 percent by weight. In general, the use of an oxygen-free atmosphere reduces the proportion of the tri-ortho-tolylphosphine needed.

As was mentioned earlier, tri-ortho-tolylphosphine is an effective photopolymerization initiator for a broad class of acrylic monomers; however, when tri-ortho-tolylphosphine was used as an initiator in the photopolymerization of styrene, a monomer that has the vinyl type linkage available for polymerization similar to the acrylic monomers, a reaction did not take place. Tri-ortho-tolylphosphine selectively initiates only the photopolymerization of acrylic type monomers as was indicated from the examples and discussion above.

Included in the term acrylic monomers as used herein, and as illustrated in the examples, refers to esters of acrylic acid or methacrylic acid. These esters are formed by reacting one of the acids mentioned above with an alcohol or a substituted alcohol containing one to eighteen carbon atoms. Suitable alcohols include methyl alcohol, butyl alcohol, hexyl alcohol, 2-ethylhexyl alcohol, decyl-octyl alcohol, lauryl alcohol, stearyl alcohol, dimethylaminoethyl alcohol, t-butylaminoethyl alcohol, glycidyl alcohol, ethoxy-ethyl alcohol, 2-methoxyethyl alcohol, hydroxyethyl alcohol, and hydroxypropyl alcohol.

While the embodiments of the present invention herein disclosed constitute preferred forms, it is to be understood that other forms might be adopted.

I claim:

1. A process for the production of polymeric material which comprises irradiating an acrylic monomer with ultraviolet light in the presence therein of a small but effective amount of tri-ortho-tolylphosphine.

2. A process according to claim 1 in an air atmosphere wherein said tri-ortho-tolylphosphine is employed in an amount within the range of from 0.003 to 5.0 percent by weight of the acrylic monomer.

3. A process according to claim 1 in an oxygen-free atmosphere wherein said tri-ortho-tolylphosphine is employed in amounts within the range of from 0.003 to 1.1 percent by weight of the acrylic monomer.

4. A process according to claim 1 wherein said acrylic monomer is methyl methacrylate.

5. A process according to claim 1 wherein said acrylic monomer is glycidyl methacrylate.

6. A new use for tri-ortho-tolylphosphine comprises the photopolymerization by means of light in the ultraviolet range of an acrylic monomer solution containing a small but effective amount of tri-ortho-tolylphosphine, said tri-ortho-tolylphosphine photo-initiating said polymerization.

7. In the photopolymerization of an acrylic monomer, the improvement in the rate of polymerization which comprises employing a small but effective amount of tri-ortho-tolylphosphine in the acrylic monomer which is then subjected to ultraviolet radiation.

References Cited

UNITED STATES PATENTS 3,331,761   7/1967   Mao _____ 204—159.23

SAMUEL H. BLECH, *Primary Examiner.*

RICHARD B. TURER, *Assistant Examiner.*

U.S. Cl. X.R.

260—88.3, 89.5